United States Patent Office 3,084,177
Patented Apr. 2, 1963

3,084,177
METHOD OF REACTING CASTOR OIL AND AN ORGANIC POLYISOCYANATE IN THE PRESENCE OF AN ORGANOMETALLIC TIN CATALYST
Fritz Hostettler and Eugene F. Cox, both of Charleston, W. Va., assignors to Union Carbide Corporation, a corporation of New York
No Drawing. Original application Sept. 25, 1957, Ser. No. 686,031. Divided and this application June 23, 1961, Ser. No. 119,024
2 Claims. (Cl. 260—404.5)

This invention relates to methods for accelerating reactions of organic compounds having reactive groups of the formula —NCY, in which Y is oxygen or sulfur, with compounds having groups containing reactive hydrogen, as determined by the Zerewitinoff method described in J. Am. Chem. Soc., vol. 49, page 3181 (1927). These methods are generically useful in promoting reactions of isocyanates and isothiocyanates with a wide variety of active hydrogen-containing compounds and have found particular and immediate applicability in the preparation of polyurethanes, a broad class of organic polymers formed by reactions of di- or polyisocyanates or di- or polyisothiocyanates with a large variety of difunctional or polyfunctional compounds having hydroxyl or amino groups containing active hydrogen, e.g., water, polyols, polyamines, polyethers, polyesters, polyoxy-carbooxy alkylenes, and the like.

A very considerable number of materials have heretofore been proposed as catalysts for accelerating isocyanate reactions generally and polyurethane preparation in particular. One of the most important disadvantages that is common to all but a few of the catalysts known to have been proposed is that they do not accelerate the reaction sufficiently to bring it within the realm of practical utility. Tertiary amines, the most popular catalysts known to have been proposed heretofore, provide slow reaction rates unless used in unsatisfactorily large amounts, typical formulations requiring one to three parts by weight of amine per 100 parts of total composition. Another very important disadvantage of proposed catalysts, including tertiary amines, is that they require elevated temperatures in reactions involving aromatic isocyanates and are essentially inactive in promoting reactions of aliphatic isocyanates at any reasonable temperature. Tertiary amines often impart an undesirable odor to reaction products of isocyanates with active hydrogen-containing compounds and, due to their basic characteristics, catalyze the degradation of the reaction products or polymers once they are formed. Cobalt naphthenate, another popular catalyst, has the disadvantage of imparting undesired color to the reaction product and of requiring a petroleum base solvent which leads to the formation of tacky foams of relatively high density. Strong bases such as sodium hydroxide, which provide greater acceleration, frequently lead to uncontrollable reactions, particularly in forming polyurethane foams, and bring about excess cross linking. Ferric acetylacetonate, a compound considered to be non-organometallic because of the absence of any carbon to metal bond, is active but has the disadvantages of being colored and of being catalytically active in oxidative degradation of organic compounds.

Other disadvantages of heretofore proposed catalysts include discoloration, particularly yellowing on aging of the reaction products, poor control over the progress of the reaction and a tendency to require use of high temperatures to bring about a satisfactory rate of reaction.

We have found that organotin compounds characterized by the presence therein of at least one direct carbon to tin bond are ideally suited for accelerating reactions of organic compounds having one or more reactive NCY groups in which Y is oxygen or sulfur with compounds having groups containing active hydrogen. Reaction rates that are obtainable in accordance with the method of the invention are up to many thousand times the rates achieved with the best catalysts heretofore proposed. These tin catalysts furthermore are essentially colorless; can be used in extremely small concentrations; have no tendency to degrade a polymer after it is formed; generally introduce no troublesome odor problems; permit reactions at practicable and controllable rates without, in most instances, requiring heating of the reactants; and broaden the field of useful isocyanates for polyurethane formation to include such relatively non-reactive materials as aliphatic isocyanates and isothiocyanates.

Extensive testing of a large variety of organotin compounds has indicated that while they vary somewhat in their activity, all tin compounds having a direct carbon to tin bond possess outstanding catalytic activity, as demonstrated in test results later described. The tin compounds of most intense, yet controllable and therefore optimum catalytic activity, are those having from one to three carbon bonds directly to a given tin atom and one or more catalytically intensifying bonds from said given tin atom to a halogen, hydrogen, oxygen, sulfur, nitrogen or phosphorus atom. Among the many types of tin compounds having carbon to tin bonds, of which specific representative compounds have been tested and shown to be active, are:

(A) Tin compounds having four carbon to tin bonds and no intensifying bonds such as tetramethyltin, tetraethyltin, tetrapropyltin, tetrabutyltin, tetraoctyltin, tetralauryltin, tetrabenzyltin, tetrakis(2-phenylethyl)tin, tetraphenyltin, tetraparatolyltin, tetravinyltin, tetraallyltin, tetrachloromethyltin, tetramethylsulfonylmethyltin, tetrapara-methoxyphenyltin, tetra-para-nitrophenyltin, as well as unsymmetrical compounds as exemplified by 2-cyanoethyltributyltin, dibutyldiphenyltin and various addition products of alkyl, aryl and aralkyltin hydrides with unsaturated organic compounds such as acrylonitrile, allyl cyanide, crotonitrile, acrylamide, methyl acrylate, allyl alcohol, acroleindiethyl acetal, vinyl acetate, styrene, etc.

(B) Tin compounds having $n$ carbon to tin bonds and $4-n$ intensifying bonds from tin to halogen or hydrogen atoms or hydroxyl groups in which $n$ is an integer from 1 to 3, such as trimethyltin chloride, tributyltin chloride, trioctyltin chloride, triphenyltin chloride, trimethyltin bromide, tributyltin fluoride, triallyltin chloride, tributyltin hydride, triphenyltin hydride, trimethyltin hydroxide, tributyltin hydroxide, dimethyltin dichloride, dibutyltin dichloride, dioctyltin dichloride, bis(2-phenylethyl)tin dichloride, diphenyltin dichloride, divinyltin dichloride, diallyltin dibromide, diallyltin diiodide, dibutyltin difluoride, bis(carboethoxymethyl)tin diiodide, bis(1,3-diketopentane)tin dichloride, dibutyltin dihydride, butyltin trichloride and octyltin trichloride.

(C) Tin compounds having two carbon to tin bonds and a catalytically intensifying double bond from tin to oxygen or sulfur, such as dimethyltin oxide, diethyltin oxide, dibutyltin oxide, dioctyltin oxide, dilauryltin oxide, diphenyltin oxide and diallyltin oxide, all prepared by hydrolysis of the corresponding dihalides, as well as bis-2-phenylethyltin oxide, $[HOOC(CH_2)_5]_2SnO$ $[CH_3OCH_2(CH_2OCH_2)_{x-1}CH_2]_2SnO$ $[CH_3OCH_2(CH_2OCH_2)_{x-1}CH_2O(CH_2)_5]_2SnO$ and dibutyltin sulfide, the $x$'s being whole integers.

(D) Tin compounds having $n$ carbon to tin bonds and $4-n$ intensifying bonds from tin to oxygen, sulfur, nitrogen or phosphorus linking organic radicals, $n$ being an integer from 1 to 3, such as tributyltin methoxide, tributyltin butoxide, tributyltin acetate, tributyltin N-piperazinylthiocarbonylmercaptide, tributyltin phosphorus dibutoxide [prepared as indicated immediately below:

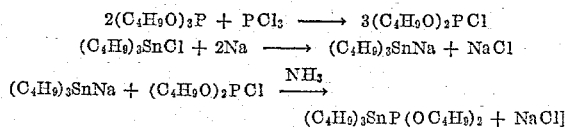

dibutyltin dibutoxide, $$(C_4H_9)_2Sn[OCH_2(CH_2OCH_2)_{x-1}CH_2CH_3]_2$$

dibutyl bis(O-acetylacetonyl)tin, dibutyltin bis(octyl maleate), "Advastab T–50–LT" (a dibutyltin compound found, upon analysis, to contain two ester groups), "Advastab 17M" (a dibutyltin compound found, upon analysis, to contain two sulfur-containing ester groups), Argus Mark A, Thermolite 20 [two trade-names for dibutyltin bis(thiododecoxide)], dibutyltin bis(octyl thioglycolate), dibutyltin bis(N-morpholinylcarbonylmethylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinylthiocarbonylmercaptide), dioctyltin bis(N-piperazinylthiocarbonylmercaptide), octyltin tris(thiobutoxide), butyltin triacetate, methylstannonic acid, ethylstannonic acid, butylstannonic acid, octylstannonic acid, $$HOOC(CH_2)_5{-}SnOOH$$

$$(CH_3)_3N^{\oplus}(CH_2)_5SnOOH$$

$$CH_3OCH_2(CH_2OCH_2)_{x-1}CH_2SnOOH$$

and $CH_3OCH_2(CH_2OCH_2)_{x-1}CH_2O(CH_2)_5SnOOH$ in which the $x$'s are positive integers.

(E) Polystannic compounds having carbon to tin bonds and preferably also intensifying bonds from tin to halogen, hydrogen, oxygen, sulfur, nitrogen or phosphorus, such as $HOOSn(CH_2)_xSnOOH$ and $$HOOSnCH_2(CH_2OCH_2)_xCH_2SnOOH$$

the $x$'s being positive integers, bis-trimethyltin, bis-triphenyltin, bis-tributyl distannoxane, dibutylin basic laurate, dibutyltin basic hexoxide and other polymeric phenyltin, bis-tributyl distannoxane, dibutyltin basic and preferably also intensifying bonds, e.g., those having repeating

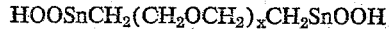

groups, dimers and trimers of $(R_2SnY)_n$ and the like in which the R's may be alkyl, aryl or aralkyl radicals and the Y's are chalcogens, as well as many other organotin compounds proposed as heat and light stabilizers for chlorinated polymers and available under such tradenames as "Advastab," "Nuostabe," and "Thermolite."

The ability of representative tin compounds characterized by a direct carbon to tin bond to accelerate isocyanate reactions is demonstrated by reacting phenyl isocyanate with methanol under essentially identical and controlled conditions. This reaction is important in such processes as the formation of polyurethanes by reaction of isocyanates with polyethers or polyesters. These tests were carried out in each instance by admixing equimolar amounts of phenyl isocyanate and methanol in n-butyl ether as solvent, adding a different catalyst to the mixture, and observing the rate of reaction at 30° C. The reaction, catalysts and relative rates based on one mol percent of catalyst per mol of isocyanate are shown immediately below:

(I) 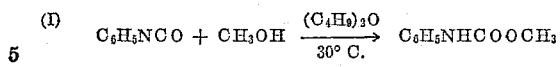

| Catalyst: | Relative rate |
|---|---|
| None | 1 |
| p-Toluenesulfonic acid | 2 |
| Acetic acid | 3 |
| N-methylmorpholine | 3 |
| Triethylamine | 11 |
| Cobalt naphthenate | 23 |
| Sodium methoxide | 140 |
| Ferric chloride | 180 |
| Tetrabutyltin | 80 |
| Tetraoctyltin | 50 |
| Tetrakis(2-phenylethyl)tin | 490 |
| Tetraphenyltin | 9 |
| 2-Cyanoethyltributyltin | 50 |
| Dibutyldiphenyltin | 380 |
| Tributyltin chloride | 400 |
| Triphenyltin chloride | 20 |
| Tributyltin fluoride | 88 |
| Tributyltin hydride | 80 |
| Trimethyltin hydroxide | 2400 |
| Tributyltin hydroxide | 500 |
| Dimethyltin dichloride | 2000 |
| Dibutyltin dichloride | 200 |
| Dioctyltin dichloride | 200 |
| Bis(2-phenylethyl)tin dichloride | 1800 |
| Divinyltin dichloride | 150 |
| Dibutyltin difluoride | 67 |
| Dibutyltin dihydride | 69 |
| Butyltin trichloride | 800 |
| Octyltin trichloride | 500 |
| Dimethyltin oxide | 11,000 |
| Dibutyltin oxide | 40,000 |
| Dioctyltin oxide | 20,000 |
| Dibutyltin sulfide | 16 |
| Tributyltin butoxide | 400 |
| Tributyltin acetate | 500 |
| Tributyltin phosphorous dibutoxide | 1200 |
| Dibutyltin dibutoxide | 40,000 |
| $(C_4H_9)_2Sn[OCH_2(CH_2OCH_2)_6CH_2OCH_3]_2$ | 30,000 |
| Dibutyl bis(O-acetylacetonyl)tin | 20,000 |
| Dibutyltin bis(octyl maleate) | 15,000 |
| "Advastab" 17 M | 7000 |
| "Advastab" T–671 | 11,000 |
| "Advastab" T–50–LT | 20,000 |
| Argus Mark A | 19,000 |
| Dibutyltin bis(thiododecoxide) | 25,000 |
| Dibutyltin dibenzenesulfonamide | 18,000 |
| Dimethyltin diacetate | 16,000 |
| Dibutyltin diacetate | 30,000 |
| Dioctyltin diacetate | 20,000 |
| Dibutyltin dilaurate | 40,000 |
| Dibutyltin maleate | 30,000 |
| Butyltin triacetate | 1400 |
| Bis-triphenyltin | 26 |
| Bis(tributyltin) oxide [$(C_4H_9)_3Sn]_2O$ | 500 |

This data indicates that tetraphenyltin, one of the least active of the organic tin catalysts, is only slightly less active than triethylamine, the strongest of several tertiary amines examined. Tributyltin actate, an example of an organotin derivative of medium catalytic activity is about fifty times more active than triethylamine, while dioctyltin oxide, one of the very active organo-tin compounds, is 2000 times more effective than triethylamine. Cobalt naphthenate, which has been used in some isocyanate recations but has the disadvantage of discoloring the reaction product, is about twice as active as triethylamine. Sodium methoxide is moderately active, considerably better than amines, but by no means approaching the activity of the better organo-tin compounds listed and unsuitable because of premature gelling of the reactants. Significantly, trimethyltin hydroxide, a moderately strong base, is a far better catalyst than such common bases as sodium and benzyltrimethylammonium hydroxides.

When the same reaction is carried out in dioxane as solvent, the results are:

(II)

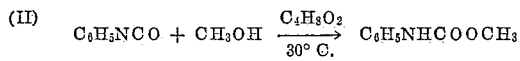

$$C_6H_5NCO + CH_3OH \xrightarrow[30° C.]{C_4H_8O_2} C_6H_5NHCOOCH_3$$

| Catalyst: | Relative rate |
|---|---|
| None | 1 |
| Triethylamine | 100 |
| Tetra-p-nitrophenyltin | 130 |
| Triallyltin chloride | 6800 |
| Diphenyltin dichloride | 160 |
| Bis(carboethoxymethyl)tin diiodide | 5800 |
| Dioctyltin oxide | 50,000 |
| Bis(2-phenylethyl)tin oxide | 30,000 |
| Tributyltin N-piperazinylthiocarbonylmercaptide | 150 |
| Dibutyltin bis(octyl thioglycolate) | 1700 |
| Dibutyltin bis(N-morpholinylcarbonylmethylmercaptide) | 1100 |
| Dibutyltin diacetate | 200,000 |
| Dibutyltin bis(N-piperazinylthiocarbonylmercaptide) | 550 |
| Dioctyltin bis(N-piperazinylthiocarbonylmercaptide) | 180 |

This data shows the catalytic activity of representative tin compounds to be equally effective when the reaction is carried out in dioxane under otherwise similar conditions.

Another extremely important reaction is that of isocyanates with water. The products are carbon dioxide and isocyanate residues linked by urylene (—NHCONH—)

links, the carbon dioxide being the blowing or foaming agent in polyurethane foam production and the urylene links serving to connect chains of isocyanate-modified polyesters and the like. In the table below are listed the approximate relative rates of reaction of phenyl isocyanate with water in dioxane as solvent at 30° C. and in the presence of 1.0 mol percent (based on isocyanate) of some of the typical catalysts used. The reaction, catalysts and relative rates were as follows:

(III)

$$2C_6H_5NCO + H_2O \xrightarrow[30° C.]{C_4H_8O_2} C_6H_5NHCONHC_6H_5 + CO_2$$

| Catalyst: | Relative rate |
|---|---|
| None | 1.0 |
| Acetic acid | 1.1 |
| Triethylamine | 19 |
| Dimethyltin dichloride | 36 |
| Dimethyltin diacetate | 460 |
| Dibutyltin diacetate | 600 |
| Dioctyltin oxide | 380 |

This data again reveals the definite advantage of the new catalysts over conventional tertiary amines. Actual foaming experience has shown that the quantity of organo-tin catalyst required for a particular foaming experiment correlates well with the rate data for the phenyl isocyanate-water reaction.

The new metal compounds are also very effective catalysts for the reaction of an isocyanate with a urea. This reaction is especially important in polyurethane chemistry because it is a principal cross linking or curing reaction. The reaction of phenyl isocyanate with diphenylurea in dioxane at 70° C., as well as the relative rates with representative catalysts in concentrations of one mole percent based on isocyanate are indicated immediately below:

(IV)

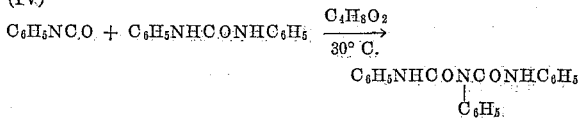

$$C_6H_5NCO + C_6H_5NHCONHC_6H_5 \xrightarrow[30° C.]{C_4H_8O_2}$$

$$C_6H_5NHCONCONHC_6H_5$$
$$\quad\quad\quad\quad |$$
$$\quad\quad\quad\quad C_6H_5$$

| Catalyst: | Relative rate |
|---|---|
| None | 1 |
| Triethylamine | 10 |
| Dibutyltin diacetate | 300 |

The organotin compounds that are useful in accordance with the invention are exceptionally good catalysts for reactions of aliphatic isocyanates. The following tables list the appropriate relative rates for reactions of octadecyl isocyanate with methanol, 1-butanol and water in n-butyl ether at 30° C. and in dioxane at 70° C. in the presence of representative catalysts, again on the basis of 1.0 mol percent concentrations:

(V)

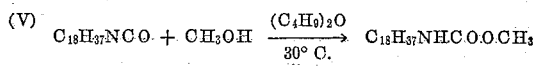

$$C_{18}H_{37}NCO + CH_3OH \xrightarrow[30° C.]{(C_4H_9)_2O} C_{18}H_{37}NHCOOCH_3$$

| Catalyst: | Relative rate |
|---|---|
| None | 1 |
| Tributylin acetate | 700 |
| Dimethyltin dichloride | 1200 |
| Dioctyltin oxide | 4900 |
| Dibutyltin diacetate | 45,000 |

(VI)

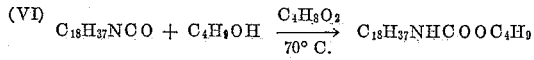

$$C_{18}H_{37}NCO + C_4H_9OH \xrightarrow[70° C.]{C_4H_8O_2} C_{18}H_{37}NHCOOC_4H_9$$

| Catalyst: | Relative rate |
|---|---|
| None | 1.0 |
| Triethylamine | 2 |
| Dibutyltin diacetate | 30,000 |

(VII)

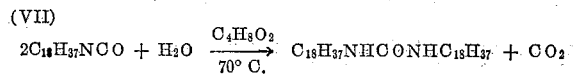

$$2C_{18}H_{37}NCO + H_2O \xrightarrow[70° C.]{C_4H_8O_2} C_{18}H_{37}NHCONHC_{18}H_{37} + CO_2$$

| Catalyst: | Relative rate |
|---|---|
| None | 1 |
| Triethylamine | 1.2 |
| Tributyltin acetate | 370 |
| Dibutyltin diacetate | 6000 |
| Dioctyltin oxide | 6000 |

The catalytic efficiency of organo-tin compounds in accelerating reactions of aliphatic isocyanates with alcohols and water is indeed striking when compared to the ineffectiveness of triethylamine.

To further demonstrate the relative activity of tin catalysts in accelerating reactions between an active hydrogen-containing compound and primary, secondary and tertiary aliphatic isocyanates, three isomeric octyl isocyanates, i.e., 1-octyl isocyanate, 2-methylheptyl isocyanate and 1,1-dimethylhexyl isocyanate, were reacted with equimolar amounts of normal-butyl alcohol with no catalyst, and with triethylamine and dibutyltin diacetate as catalysts in dioxane at 70° C. The relative rates, based on the presence of one mol percent catalyst, are shown in the following table:

| Isocyanate | Catalyst | | |
|---|---|---|---|
| | None | Triethylamine | Dibutyltin diacetate |
| n—$C_7H_{15}$—$CH_2$—NCO | 1.0 | 1.7 | 11,000 |
| n—$C_6H_{13}$—CH—NCO<br>$\quad\quad\quad\quad\quad$ \|<br>$\quad\quad\quad\quad\quad$ $CH_3$ | 0.45 | 0.80 | 6,500 |
| $\quad\quad\quad\quad\quad$ $CH_3$<br>$\quad\quad\quad\quad\quad$ \|<br>n—$C_5H_{11}$—C—NCO<br>$\quad\quad\quad\quad\quad$ \|<br>$\quad\quad\quad\quad\quad$ $CH_3$ | .027 | .13 | 650 |

The data in this table indicates again the superior activity of organotin compounds, as represented by dibutyltin diacetate as a catalyst for the reaction and the relative inefficiency of triethylamine as a catalyst.

Isothiocyanates are considerably less reactive than isocyanates toward compounds containing active hydrogen. Diisothiocyanates have been proposed for use in preparing polyurethane coatings but, because of their low reactivity with difunctional active hydrogen-containing compounds, have hitherto not shown much promise. The organo-tin compounds are excellent catalysts for such reactions. The data recorded below for reaction of phenyl isothiocyanate and 1-butanol in the presence of ten mol percent catalyst at 70° C. in butyl ether demonstrate clearly the extremely high activity of organo-tin catalysts.

(VIII)

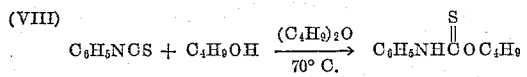

| Catalyst: | Relative rate |
| --- | --- |
| None | 1 |
| Triethylamine | 20+ |
| Dibutyltin diacetate | 2000+ |

The catalytic activity of organotin compounds in accelerating reactions of diisocyanates with compounds containing reactive hydrogen is demonstrated by comparing reaction rates of 2,4-tolylene-, hexamethylene- and meta-xylylene diisocyanates with 1-butanol without a catalyst and in the presence of triethylamine and dibutyltin diacetate. The first of these diisocyanates is well known as a reactant in the preparation of polyurethanes and the latter two, although otherwise promising, have not been considered useful heretofore because of the low rate of activity even with the best of catalysts heretofore proposed. The data recorded below for the reaction of these diisocyanates with 1-butanol in the presence of one mol percent catalyst at 70° C. in dioxane demonstrates the favorable accelerations obtained:

(IX)

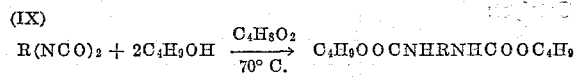

| Diisocyanate | Catalyst | | |
| --- | --- | --- | --- |
| | None | Triethylamine | Dibutyltin diacetate |
| 2,4-tolylene | 1.0 | 3.8 | 2,040 |
| Hexamethylene | 0.33 | 0.82 | 1,400 |
| Meta-xylylene | 0.33 | 7.9 | 3,700 |

It is surprising that the tin catalyst accelerates the reaction of meta-xylylene diisocyanate even more than of 2,4-tolylene diisocyanate inasmuch as the reaction rate of the meta-xylylene diisocyanate without a catalyst is slower. It is also significant that the reaction rate of hexamethylene diisocyanate with dibutyltin diacetate as a catalyst is many times greater than the reaction rate of the tolylene diisocyanate with triethylamine as a catalyst, thus making feasible the use of hexamethylene diisocyanate on a large scale in the preparation of polyurethanes and other isocyanate-modified polyesters and polyethers.

The foregoing data illustrates the remarkably high catalytic activity of organotin compounds characterized by having at least one direct carbon to tin bond and particularly of those having in addition a catalytic intensifying bond from tin to halogen, hydrogen, oxygen, sulfur, nitrogen or phosphorus. The reactions accelerated were chosen to provide accurate means for comparison of reaction rates under carefully controlled conditions and as a guide to the magnitude of "catalytic amounts" involved without in any sense being considered limitative of the scope of the invention.

To further illustrate some of the more practical applications of the catalytic method of this invention and demonstrate by way of example the utility thereof in the formation of polyurethanes, the following additional examples are included:

*Example 1*

228 grams of epsilon-caprolactone, 176 grams of ethylene oxide and 11.4 grams of ethylene glycol were copolymerized in the presence of 0.55 gram of boron trifluoride-diethyl etherate (47% BF$_3$) to form linear lactone-ethylene oxide copolymers having divalent ethylene and pentamethylene groups connected to one another by oxy (—O—) and carbooxy (—COO—) links, a hydroxyl number of 50.5 and a carboxyl number of 2.0.

Twenty-gram portions of the lactone-ethylene oxide copolymer thus prepared were mixed at room temperature with 1.74 ml. of a 65:35 mixture of 2,4- and 2,6-tolylene diisocyanates in the presence of 0.1 gram of catalyst, one batch being mixed without adding a catalyst. The time required for each polymer system to gel is recorded in the table below.

| Catalyst: | Gel-time, min. |
| --- | --- |
| None | 1440 |
| N-methylmorpholine | 120 |
| Dibutyltin oxide | 3 |
| Dioctyltin oxide | 2 |

The data in this table demonstrates the excellent catalytic efficiency of representative tin catalysts for modification of hydroxyl-terminated linear copolymers with aromatic diisocyanates widely used in the preparation of polyurethanes and further the correlation thereof with the data reported previously.

*Example 2*

75 grams of a long-chain linear polyester prepared by reaction of adipic acid and diethylene glycol and having a hydroxyl number of 50.4 and a carboxyl number of 5.2 were thoroughly mixed with 1.5 ml. water, 2.0 ml. emulsifying agent and 2.0 ml. of a benzene solution containing 50.9% dioctyltin oxide as a catalyst. 25 grams of meta-xylylene diisocyanate were then added with vigorous stirring. The mixture was transferred to an open mold as soon as it started foaming.

The foam was removable from the mold about ten minutes after completion of the foaming process, indicating a highly efficient curing reaction. The foam had a density of 2.97 lbs./cu. ft. and compression loads of 0.22 and 0.45 p.s.i. at 10 and 50% deflection, respectively.

This example is of particular interest in demonstrating the effectiveness of tin catalysts in producing polyurethane foams with a diisocyanate that is essentially aliphatic in its characteristics and hitherto incapable of forming foamed polyurethanes with tertiary amine catalysts.

*Example 3*

1250 grams of epsilon-caprolactone, 1268 grams of ethylene oxide and 67 grams of trimethylolpropane were copolymerized at 60 to 70° C. in the course of 5.5 hours and in the presence of boron trifluoride ethyl etherate (47% BF$_3$) to form a branched chain structure having series of divalent ethylene and pentamethylene groups connected to one another by means of oxy and carbooxy links. The copolymer had a hydroxyl number of 36.8 and a carboxyl number of 1.3.

75 grams of the copolymer, 1 ml. of emulsifying agent, 2 ml. of water and 2 ml. of a benzene solution containing 50.9% dioctyltin oxide were thoroughly mixed. 22 grams of metaxylylene diisocyanate were then added with vigorous stirring. The mixture was transferred to an open mold as soon as it started foaming.

As in Example 2, the foam could be removed from the mold about ten minutes after the foaming process was completed, indicating the very efficient curing reaction.

The foam density was 2.24 lbs./cu. ft. and the foam had compression loads of 0.13 and 0.26 p.s.i. at 10 and 50% deflection, respectively.

Example 4

1100 grams of epsilon-caprolactone, 1100 grams of ethylene oxide and 62 grams of ethylene glycol were copolymerized at 65° C. in the course of five hours in the presence of 2.6 grams boron trifluoride ethyl etherate (47% $BF_3$). The resulting linear copolymer had a hydroxyl number of 49.1 and a carboxyl number of 1.6.

100 grams of the linear polymer thus prepared were mixed thoroughly with 2.9 grams water and 1.0 ml. dibutyltin diacetate. 40 grams of a 65:35 mixture of 2,4- and 2,6-tolylene diisocyanate containing 0.5% "Ethocell," an ethoxylated cellulose, were then added with vigorous stirring. The mixture was transferred to an open mold as soon as it started foaming.

The foam was removable from the mold about ten minutes after completion of the foaming, indicating a very efficient curing reaction. The foam had a density of 2.36 lbs./cu. ft. and compression loads of 1.15 and 1.75 p.s.i. at 10 and 50% deflection, respectively.

Example 5

100 grams of the linear copolymer prepared as described in the first paragraph of Example 4 were thoroughly mixed with 3.1 ml. water and 2.0 ml. of a benzene solution containing 50.9% dioctyltin oxide. 40 grams of a 65:35 mixture of 2,4- and 2,6-tolylene diisocyanate containing 1.0% "Ethocell" were then added while stirring vigorously. The mixture was transferred to an open mold as soon as it started foaming and was again removable from the mold ten minutes after the foaming process was completed.

The foam had a remarkably low density of 1.74 lbs./cu. ft. and compression loads of .40 and .73 p.s.i. at 10 and 50% deflection, respectively.

Example 6

100 grams of the adipic acid-diethylene glycol polyester described in Example 2, two grams of emulsifying agent, 2.9 ml. water and 1.0 ml. dibutyltin diacetate were thoroughly mixed. 40 grams of a 65:35 mixture of 2,4- and 2,6-tolylene diisocyanate containing 0.5% "Ethocell" were then added with vigorous stirring. The mixture was transferred to an open mold as soon as it started foaming and could be removed from the mold about ten minutes after the foaming process was complete. The foam had a density of 2.60 lbs./cu. ft. and compression loads were 1.07 and 1.10 p.s.i. at 10 and 50% deflection, respectively.

Example 7

100 grams of a polyester prepared from adipic acid and 1,2,6-hexanetriol and having a hydroxyl number of 285 and a carboxyl number of 0.33 were mixed vigorously with 72 grams of a 80:20 mixture of 2,4- and 2,6-tolylene diisocyanate, 2.5 grams of water, 0.5 gram of an emulsifying agent ("Emulphor EL-719"; an ethylene oxide adduct of vegetable oil) and 0.1 gram dibutyltin diluarate. The mixture was transferred to an open mold as soon as it started foaming and was allowed to expand. The foam reached its maximum height within about ninety seconds and was cured to a rigid foam within about five minutes. The foam had a density of 3.4 lbs./cu. ft.

Example 8

A prepolymer was prepared by heating 1935 grams polypropylene glycol 2025 having a hydroxyl number of 58.5, a carboxyl number of 0.15 and a water content of 0.1% with 215 grams of a 80:20 mixture of 2,4- and 2,6-tolylene diisocyanate to 120° C. for three hours. After this time, 580 grams of additional tolylene diisocyanate were added and the mixture was held at a temperature of 100° C. for an additional hour. The resulting prepolymer was allowed to cool to room temperature.

208 grams of the prepolymer thus prepared were mixed vigorously with 3.0 grams 1,2,6-hexanetriol, 4.1 grams water, 1.1 grams DC-200 silicone oil having a viscosity of 50 centistokes and 0.6 gram dibutyltin diacetate. The resulting foam, identified in the table below as Foam A, cured at room temperature within about thirty minutes.

The foaming of the same prepolymer was repeated in the same manner except that 0.6 gram dibutyltin dilaurate was used as catalyst. The resulting foam, identified as Foam B, also cured within about thirty minutes at room temperature. The foams had the following physical properties:

| | Foam A | Foam B |
|---|---|---|
| Density, lbs./cu. ft. | 2.41 | 2.85 |
| Tensile strength, p.s.i. | 16 | 18 |
| Compression load at 25% deflection, p.s.i. | 0.306 | 0.503 |
| Compression load at 50% deflection, p.s.i. | 0.433 | 0.796 |

Example 9

300 grams polypropylene glycol 2025 having a hydroxyl number of 58.5 and a carboxyl number of 0.15, 4.5 grams ethanolamine and 0.35 gram dibutyltin dilaurate were mixed at room temperature. 51.6 grams of a 65:35 mixture of 2,4- and 2,6-tolylene diisocyanate were then added to and mixed with the initial mixture. The resulting paste was transferred to a shallow dish and baked for four hous at 70° C. The resulting product could be easily handled on a cold two-roll rubber mill and the milled sheet was a tough elastomer.

Example 10

A prepolymer was prepared by heating a mixture of 400 grams castor oil having a hydroxyl number of 161.5, 200 grams of an 80:20 mixture of 2,4- and 2,6-tolylene diisocyanate and 200 grams anhydrous toluene to 100° C. for 1.5 hours. The resulting prepolymer solution had a free isocyanate content of 5.25% NCO.

60 grams of the prepolymer solution thus prepared were mixed with 0.5 gram ethylene glycol and 0.023 gram dioctyltin oxide. The mixture was spread on a glass plate to form a film which was allowed to air-dry. After three days the film was found to possess a tensile strength of 3100 p.s.i. and an elongation of 89.4%. It was found to be essentially non-yellowing and to have superior adhesion and improved light stability compared with a similar castor oil-tolylene diisocyanate film wherein N-methyldiethanolamine was used as the catalyst.

The terms "isocyanate" and "isothiocyanates" are used herein to refer to mono- and polyisocyanates and to mono- and polyisothiocyanates, respectively, including particularly diisocyanates and diisothiocyanates. While the invention has been described specifically with reference to the reaction of certain monoisocyanates, diisocyanates and monoisothiocyanates, it is generically applicable to the reaction of any compound containing one or more —N=C=Y groups in which Y is oxygen or sulfur. Compounds within this generic definition include monoisocyanates and monoisothiocyanates of the general formula

RNCY in which R is a hydrocarbon or substituted hydrocarbon radical such as alkyl, cycloalkyl, alkenyl, alkynyl, aralkyl, aryl, alkaryl, or a substituted analogue thereof. Examples of such compounds include methyl isocyanate, ethyl isocyanate, butyl isocyanate, octyl isocyanate, octadecyl isocyanate, vinyl isocyanate, isopropenyl isocyanate, ethynyl isocyanate, benzyl isocyanate, phenyl isocyanate, vinylphenyl isocyanate, tolyl isocyanate, ethyl isothiocyanate and phenyl isothiocyanate. Also included are polyisocyanates and polyisothiocyanates of the general formula $$R(NCY)_x$$

in which $x$ is two or more and R can be alkylene, substituted alkylene, arylene, substituted arylene, a hydrocarbon or substituted hydrocarbon containing one or more aryl-NCY bonds and one or more alkyl-NCY bonds, a hydrocarbon or substituted hydrocarbon containing a plurality of either aryl-NCY or alkyl-NCY bonds. R can also include radicals such as —R—Z—R— where Z may be any divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-menthane, xylylene diisocyanates, $(OCNCH_2CH_2CH_2OCH_2)_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylylene-α,α'-diisothiocyanate, and isopropylbenzene-α,4-diisocyanate.

Further included are dimers and trimers of isocyanates and diisocyanates and polymeric diisocyanates of the general formulae $$(RNCY)_x \text{ and } [R(NCY)_x]_y$$

in which $x$ and $y$ are two or more, as well as compounds of the general formula $$M(NCY)_x$$

in which $x$ is one or more and M is a monofunctional or polyfunctional atom or group. Examples of this type include ethylphosphonic diisocyanate, $C_2H_5P(O)(NCO)_2$; phenylphosphonous diisocyanate, $C_6H_5P(NCO)_2$; compounds containing a ≡Si—NCY group, isocyanates derived from sulfonamides $(RSO_2NCO)$, cyanic acid, thiocyanic acid, and compounds containing a metal-NCY group such as tributyltin isocyanate.

It is also to be understood that the active hydrogen-containing compounds that are capable of reacting with isocyanates in accordance with the method of the invention are by no means limited to compounds containing hydroxyl and amino groups but generically include all compounds which give a positive test for reactive hydrogen as determined by the Zerewitinoff method. Typical of the active hydrogen-containing compounds whose reaction with isocyanates and isothiocyanates may be accelerated and in some instances even made possible are compounds containing an oxygen-hydrogen bond, such as water, hydrogen peroxide, alcohols, hydroperoxides, phenols, boronic acids, carboxylic acids, percarboxylic acids and sulfonic acids; compounds containing a nitrogen-hydrogen bond, such as ammonia, amines, amides, lactams, ureas, urethanes, allophanates, biurets, acyl ureas, thioureas, hydrazines, oximes, amidines, hydroxylamines, hydrazones, hydroxamic acids, nitramines, diazoamino compounds, and sulfonamides; compounds containing a sulfur-hydrogen bond, such as mercaptans, thiophenols and thioacids; halogen acids; compounds containing active methylene groups and compounds capable of forming enols such as acetone, malonic esters, acetoacetic esters, acetylacetone and nitromethane; and miscellaneous active hydrogen-containing compounds, such as acetylenic compounds and dialkyl phosphonates. Also included among the applicable active hydrogen-containing compounds are compounds containing two or more of any one or combination of active hydrogen groups already described. Examples include ethylene glycol, diethylene glycol, hexamethylene glycol, glycerol, 1,2,6-hexanetriol, sorbitol, dextrin, starch, cellulose, polyvinyl alcohol, ethylene-vinyl alcohol copolymers, cellulose acetate, shellac, castor oil, polyesters, alkyd resins, polyvinyl acetals, polyvinyl ketals, polyethers, polyetheresters, polyacrylic acids, ethylene diamine, hexamethylene diamine, ethanolamines, polyesteramides, poly(hexamethylene adipamide), wool, and proteins. Materials such as glass and metal which have thin films of moisture on their surfaces at the time of reaction with an isocyanate or isothiocyanate are also included.

The method of the invention is particularly suitable for reaction of organic polyisocyanates with high molecular weight polymers having at least two end groups containing reactive hydrogen. A preferred class of such polymers includes polyoxyalkylene polyols. These are long chain polyols containing one or more chains of connected oxyalkylene groups. Most desirably, these polyoxyalkylene polyols are liquids having an average molecular weight in the range of 500 to 5000.

Examples of these polyoxyalkylene polyols include polypropylene glycols having average molecular weights of 500 to 500, and reaction products of propylene oxide with linear diols and higher polyols, said higher polyols when employed as reactants giving rise to branched polyoxyalkylene polyols; and ethylene oxide-propylene oxide heteric copolymers having average molecular weights of 500 to 5000 and in which the weight ratio of ethylene oxide to propylene oxide ranges between 10:90 and 90:10, including reaction products of mixtures of ethylene oxide and propylene oxide in the said ratios with linear diols and higher polyols.

Examples of linear diols referred to as reactants with one or more alkylene oxides include ethylene glycol, propylene glycol, 2-ethylhexanediol-1,3 and examples of higher polyols include glycerol, trimethylolpropane, 1,2,6-hexanetriol, pentaerythritol and sorbitol.

Another class of polyoxyalkylene polyols are the so-called block copolymers having a continuous chain of one type of oxyalkylene linkage connected to blocks of another type of oxyalkylene linkage. Examples of such block copolymers are reaction products of polypropylene glycols having average molecular weights of 500 to 5000 with an amount of ethylene oxide equal to 5 to 25% by weight of the starting polypropylene glycol. Another class of such block copolymers is represented by the corresponding reaction products of propylene oxide with polyethylene glycols.

Further examples of the class of polyoxyalkylene polyols include polyethylene glycols, polybutylene glycols and copolymers, such as polyoxyethyleneoxybutylene glycols and polyoxypropyleneoxybutylene glycols. Included in the term "polybutylene glycols" are polymers of 1,2-butylene oxide, 2,3-butylene oxide and 1,4-butylene oxide.

Among the polyesters which are suitable reactants for isocyanates are those having reactive hydrogen-containing terminal groups, preferably predominantly hydroxyl groups. Polyesters are reaction products of polyols, such as the aforementioned aliphatic polyols and in particular the class of aliphatic polyols containing from two to ten carbon atoms, with polycarboxylic acids having from two to thirty-six carbon atoms, e.g., oxalic acid, succinic acid, maleic acid, adipic acid, sebacic acid, isosebacic acids, phthalic acids, and dimer acids such as those obtained by coupling two molecules of linoleic acid.

Another preferred class of polymers having terminal groups that contain reactive hydrogen atoms and are suitable for reaction with polyisocyanates are the lactone polymers, preferably those having molecular weights within the range of about 500 to 10,000. These include polymers formed by reaction of polyfunctional initiators having reactive hydrogen atoms with one or more lactones, whereby the lactone rings are successively opened and added to one another as lactone residues to form long chains, as well as copolymers in which there are random or ordered distributions of opened lactone residues and alkylene oxides in the chain, and block copolymers thereof. The lactones that are particularly suitable in polymers and copolymers of this type are the epsilon-caprolactones preferably the unsubstituted caprolactones and caprolactones having up to about three alkyl substituents on the ring. The lactone residues and block copolymers may be linked by oxyalkylene chains derived from ethylene oxide, propylene oxide, butylene oxide or the like, and by polyoxyalkylene chains, e.g., polyoxypropylene, polyoxyethylene, polyoxybutylene chains or mixtures or copolymers thereof.

It is also to be understood that a compound containing reactive NCY groups and reactive hydrogen, such as a prepolymeric reaction product of any of the foregoing polymers with an isocyanate, can be reacted with itself or with a compound containing reactive hydrogen, such as water, a polyol or an aminoalcohol.

It is to be expected that numerous modifications will readily become apparent to those skilled in the art upon reading this description. All such modifications are intended to be included within the scope of the invention as defined in the appended claims.

This application is a division of copending application 686,031, filed September 25, 1957, in the name of Fritz Hostettler and Eugene F. Cox.

What is claimed is:

1. The method which comprises reacting castor oil with an organic polyisocyanate in the presence of a catalytic amount of organotin compound having at least one carbon to tin bond, any remaining bonds from tin being to a member of the group consisting of halogen, hydrogen, oxygen, sulfur, nitrogen, and phosphorus atoms.

2. The method which comprises forming a film of a mixture of inert vehicle, castor oil-organic diisocyanate prepolymer having unreacted isocyanato groups and produced by reacting a molar excess of organic diisocyanate with castor oil, alkylene glycol, and a catalytic amount of organotin compound having at least one carbon to tin bond, any remaining bonds from tin being to a member of the group consisting of halogen, hydrogen, oxygen, sulfur, nitrogen, and phosphorus atoms; and subsequently removing said inert vehicle from said film and reacting said prepolymer with said alkylene glycol to form an essentially non-yellowing, tough, adherent coating.

References Cited in the file of this patent

UNITED STATES PATENTS 2,893,898  Evans et al. _____ July 7, 1959